US008858772B2

United States Patent
Crane et al.

(10) Patent No.: US 8,858,772 B2
(45) Date of Patent: Oct. 14, 2014

(54) BIDIRECTIONAL ELECTROWETTING ACTUATION WITH VOLTAGE POLARITY DEPENDENCE

(75) Inventors: Nathan B. Crane, Lutz, FL (US); Pradeep Mishra, Santa Clara, CA (US); Alex Volinsky, Tampa, FL (US)

(73) Assignee: University of South Florida, Tampa, FL (US)

( * ) Notice: Subject to any disclaimer, the term of this patent is extended or adjusted under 35 U.S.C. 154(b) by 154 days.

(21) Appl. No.: 13/525,806

(22) Filed: Jun. 18, 2012

(65) Prior Publication Data

US 2012/0247960 A1 Oct. 4, 2012

Related U.S. Application Data

(63) Continuation-in-part of application No. PCT/US2010/060763, filed on Dec. 16, 2010.

(60) Provisional application No. 61/286,944, filed on Dec. 16, 2009.

(51) Int. Cl.
 *G01N 27/453* (2006.01)
 *G02B 26/00* (2006.01)
(52) U.S. Cl.
 CPC .................................. *G02B 26/005* (2013.01)
 USPC ..................................................... 204/600
(58) Field of Classification Search
 USPC ................................................. 204/450, 600
 See application file for complete search history.

(56) References Cited

U.S. PATENT DOCUMENTS

| 2004/0055536 | A1 | 3/2004 | Kolar et al. | |
| 2004/0055891 | A1 | 3/2004 | Pamula et al. | |
| 2008/0100905 | A1* | 5/2008 | Kato et al. | 359/295 |
| 2008/0210558 | A1 | 9/2008 | Sauter-Starace et al. | |
| 2009/0051736 | A1* | 2/2009 | Sugahara | 347/55 |
| 2009/0103159 | A1 | 4/2009 | Cheng et al. | |
| 2009/0262435 | A1* | 10/2009 | Kim et al. | 359/665 |

FOREIGN PATENT DOCUMENTS

WO 2011042835 A1 4/2011

OTHER PUBLICATIONS

Mugele, F., Baret, J.-C., 2005, "Electrowetting: From Basics to Applications," Journal of Physics Condensed Matter, 17(28) pp. R705-R774.

Cho, S. K., Moon, H., Kim, C.-J., Feb. 2003, "Creating, Transporting, Cutting, and Merging Liquid Droplets by Electrowetting-Based Actuation for Digital Microfluidic Circuits," Journal of Microelectromechanical Systems, 12(1) pp. 70-80.

(Continued)

*Primary Examiner* — Alex Noguerola
(74) *Attorney, Agent, or Firm* — Molly Sauter; David Jacobs; Smith & Hopen, P.A.

(57) ABSTRACT

A novel electrowetting system for the smooth continuous movement of a droplet across a single circuit using a continuous applied voltage regardless of polarity. The actuation of the droplet is achieved by introducing a diode into the idealized electrical circuit of the electrowetting system. The diode is in parallel with a capacitor (dielectric) and effectively shorts the droplet on the side of a lower potential electrode so that the entire voltage drop is across the dielectric over the opposite electrode. This creates an energy imbalance that moves the droplet towards the higher potential. If the voltage polarity is reversed, the direction of actuation will reverse as well.

11 Claims, 4 Drawing Sheets

(56) References Cited

OTHER PUBLICATIONS

Lynch, C. M., Volinsky, A. A., Khodayari, M., Crane, N. B., Demonstration of Continuous Electrowetting Actuation, Proceedings of ASME International Mechanical Engineering Congress and Exposition, IMECE 2010, Nov. 12-18, 2010, Vancouver, British Columbia, pp. 1-5.

K. Mohseni and E. S. Baird, Digitized heat transfer using electrowetting on dielectric, Nanoscale Microscale Thermophys. Eng. 11, pp. 99-108 (2007).

S. Kuiper and B. H. W. Hendriks, Variable-focus liquid lens for miniature cameras. Appl. Phys. Lett. vol. 85, No. 7, pp. 1128-1130 (2004).

C. G. Cooney, C. Y. Chen, M. R. Emerling, A. Nadim and J. D. Sterling, Electrowetting droplet microfluidics on a single planar surface. Microfluid. Nanofluid. vol. 2, pp. 435-446 (2006).

M. Washizu, Electrostatic Actuation of Liquid Droplets for Microreactor Applications. IEEE Trans. Ind. Appl. vol. 34, No. 4, pp. 732-737 (1998).

K. F. Bohringer, Modeling and Controlling Parallel Tasks in Droplet-Based Microfluidic Systems, IEEE Trans. Comput-Aided Des. Integr. Circuits Syst. vol. 25, No. 2, pp. 334-344 (2006).

Han-Sheng Chuang, A. Kumar and S. T. Wereley, Open Optoelectrowetting Droplet Actuation, Appl. Phys. Lett. 93, 064104 (2008).

P. Y. Chiou, H. Moon, H. Toshiyoshi, C. J. Kim and M. C. Wu, Light Actuation of Liquid by Optoelectrowetting, Sens. Actuator A-Phys. 104, 222-228 (2003).

S. K. Fan, H. P. Yang, T. T. Wang and W. Hsu, Asymmetric Electrowetting-Moving Droplets by a Square Wave, Lab on a Chip 7, pp. 1330-1335 (2007).

Nathan Brad Crane, Alex A. Volinsky, Vivek Ramadoss, Michael Nellis, Pradeep Mishra and Xiaolu Pang, Analysis and Measurement of Forces in an Electrowetting-Driven Oscillator, Materia. Res. Soc. Symp. Proc., vol. 1052, pp. 285-291, DD8.1 (2007).

B. M. Grafov, On the Theory of the Electrochemical Diode, Russian Chemical Bulletin 13, pp. 763-769 (1964).

I. Oshida, Theory of Electrochemical Diodes, J. Phys. Soc. Jpn. vol. 15, No. 12, pp. 2288-2294 (1960).

Florian Krogmann, Hong Qu, Wolfgang Monch and Hans Zappe, Push/Pull actuation using opto-electrowetting, Sens Actuators A Phys 141, pp. 499-505 (2008).

S. Bains, Electrowetting boosts speed, color, contrast. Laser Focus World 40, 43 (2004).

\* cited by examiner

BIDIRECTIONAL ELECTROWETTING ACTUATION WITH VOLTAGE POLARITY DEPENDENCE

CROSS REFERENCE TO RELATED APPLICATION

This application is a continuation in part of prior filed International Application, Serial Number PCT/US2010/060,763 filed Dec. 16, 2010, which claims priority to U.S. provisional patent application No. 61/286,944, entitled "BIDIRECTIONAL ELECTROWETTING ACTUATION WITH VOLTAGE POLARITY DEPENDENCE," filed on Dec. 16, 2009, the contents of which are hereby incorporated by reference.

GOVERNMENT SUPPORT

This invention was made with government support under Grant Nos. CMMI-0600266 and CMMI-0927637 awarded by the National Science Foundation. The government has certain rights in the invention.

BACKGROUND OF THE INVENTION

1. Field of the Invention

This invention relates to an electrowetting system. More specifically, it relates to an electrowetting system for the smooth continuous movement of a droplet across a single circuit using a continuous applied direct current voltage.

2. Description of the Prior Art

Recent technical advances have enabled the manipulation of small volumes of fluids—often in discrete droplets. Many of these systems utilize the phenomena of electrowetting to manipulate the small electrical droplets. Electrowetting on dielectric (EWOD) is the reduction in apparent contact angle of a fluid droplet using the capacitance of a dielectric layer which lies between the droplet and an electrode. Applying voltage across this barrier (between the droplet and electrode) causes charge migration to occur within the droplet and electrode, which modifies the apparent surface energy of the droplet, causing its apparent contact angle to be reduced.

Applications for electrowetting, in general, are diverse, ranging from the shaping of microlenses, fiber optics switching, display technology, and optical filters, to such interesting areas as the creation of small low-power-consumption motors. When looking at applications for EWOD droplet transport, the most significant (with much interest and diversity of research) is lab-on-a-chip designs. Also, the use of droplet motion to assist in assembly of nano- and micro-scale components for microdevices holds promise.

Droplet movement by asymmetric electrowetting (where only a portion of the droplet has its contact angle reduced causing droplet motion) is known in the prior art. The prior art uses successive activation of discrete small electrodes, several of which are covered by the droplet. As each electrode is activated and the contact angle above it reduced, the droplet is "handed off" from electrode to electrode. This accomplishes droplet movement in successive discrete steps each having a magnitude equivalent to the size of the electrodes and requires complex control systems to control the activation of electrodes in the proper sequence and with the proper timing. Moreover, because electrowetting behavior is related to the voltage squared, it is typically shows no significant dependence on voltage polarity.

Accordingly, what is needed is an electrowetting system for the smooth continuous movement of a droplet across a single circuit using a continuous voltage.

What is also needed is an electrowetting system that is dependent on the polarity of the applied voltage, i.e., the actuation direction changes with a change in voltage polarity.

However, in view of the prior art considered as a whole at the time the present invention was made, it was not obvious to those of ordinary skill in the art how the limitations of the art could be overcome.

SUMMARY OF INVENTION

The claimed invention is a novel electrowetting system for the smooth continuous movement of a droplet across a single circuit using a continuous applied voltage regardless of polarity. The actuation of the droplet is achieved by introducing a diode into the idealized electrical circuit of the electrowetting system. The diode is in parallel with a capacitor (dielectric) and effectively shorts the droplet on the side of a lower potential electrode so that the entire voltage drop is across the dielectric over the opposite electrode. This creates an energy imbalance that moves the droplet towards the higher potential. If the voltage polarity is reversed, the direction of actuation will reverse as well.

Generally speaking, the electrowetting system includes: (1) an electrode layer adapted to act as a resistor; (2) a dielectric layer adapted to act as a capacitor disposed in overlying relation to the electrode layer; (3) a plurality of diodes adapted to act as diodes in parallel with the dielectric layer and disposed within the dielectric layer; (4) a hydrophobic surface treatment layer adapted to act as a capacitor in parallel with the dielectric layer and the plurality of diodes and disposed in overlying relation to the electrowetting system; (5) an electrolyte droplet disposed in overly relation to the hydrophobic surface treatment layer; and (6) a voltage applied to the electrowetting system, causing said electrolyte droplet to move due to a potential difference in the electrowetting system.

In an embodiment, the electrowetting system uses the current-rectifying properties of oxide films of the so-called valve metals to construct the diodes. By patterning an array of holes in the dielectric layer, under which lies a valve metal electrode, and applying a potential across the electrode, the side of the droplet above the anodic hole will have its contact angle reduced. As the droplet flows to cover the next-most-positively charged hole, the previously anodic hole will become cathodic (allowing current flow) and the newly-covered hole will become anodic, causing the contact angle to be reduced over it. This sequence is repeated until the potential is removed or the array of holes ends.

In an embodiment, electrochemical diodes are created by holes in the dielectric that expose an aluminum electrode to NaCl solution. The aluminum electrode self-passivates and prevents current flow in one direction. This creates a diode-like electrical behavior. Other salt and acidic solutions including Na2S04, tartaric acid and citric acid could be used.

In an embodiment, the electrowetting system is fabricated by: (1) providing a silicon substrate; (2) applying a layer of $SiO_2$ in overly relation to said silicon substrate; (3) patterning a layer of photoresist in overlying relation to said layer of (4) etching voids in said layer of $SiO_2$; (5) applying a layer of aluminum in overly relation to said phototresist and within said etched voids in said layer of $SiO_2$; (6) removing said layer of photoresist along with unwanted aluminum; and (7) coating said eletrowetting system with a layer of hydrophobic surface treatment.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
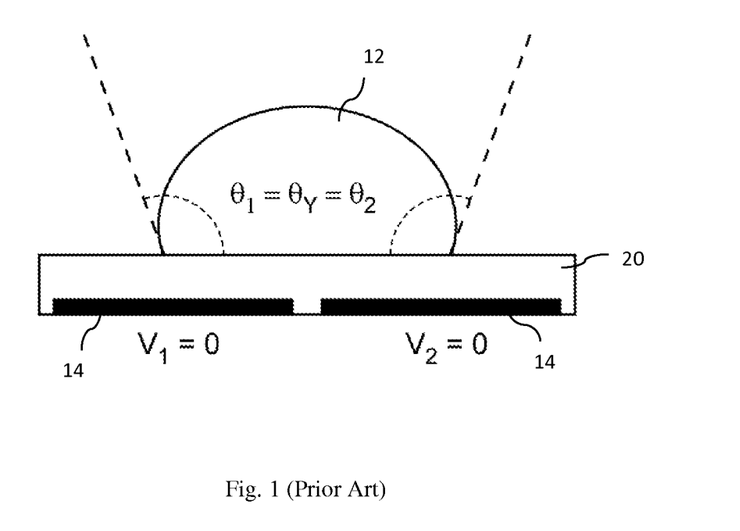
FIG. 1 depicts the natural (or Young's) contact angle when no voltage is applied in the prior art.
Figure 2:
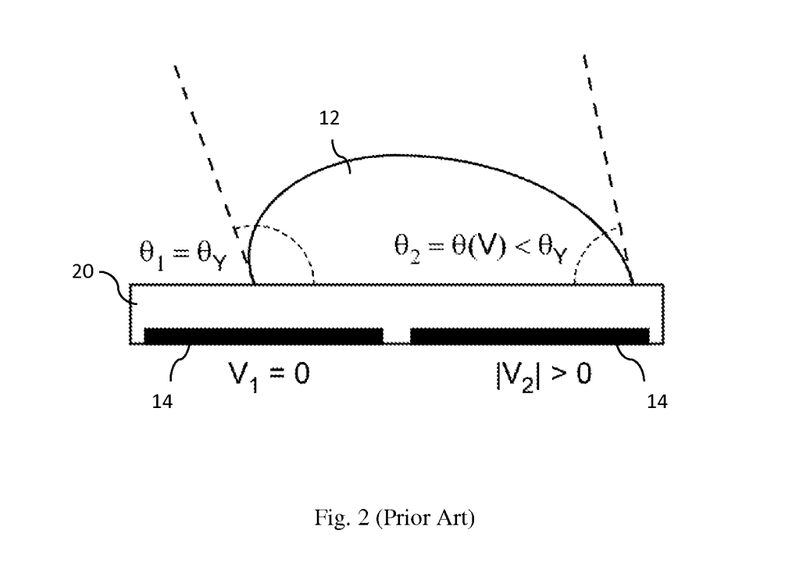
FIG. 2 depicts the reduced contact angle (and resulting droplet asymmetry) when voltage is applied only to the right-hand electrode in the prior art.

As collectively depicted in prior art FIGS. 1 and 2, electrowetting results in a reduction of contact angle in the presence of an electrical potential difference between the droplet 12 and the electrode 14 it lies upon. To reduce the contact angle of only a portion of the droplet 12 (to achieve droplet motion/transport), there must exist a difference in potential only between a portion of the drop and substrate (or the potential difference between droplet and substrate must be significantly greater in one portion of the droplet compared to another). In order to achieve asymmetry in electrical potential, the substrate must be manipulated. As discussed above in the prior art, the paradigm has been to use a series of small electrodes 14, several of which are covered by the drop 12 at any one time. In this way, only the portion of droplet immediately above an energized electrode 14 has its contact angle reduced, and motion can be achieved by sequentially energizing the desired electrodes no that the leading edge of the droplet repeatedly experiences contact angle reduction, moving forward a small amount in each step.

Figure 3:
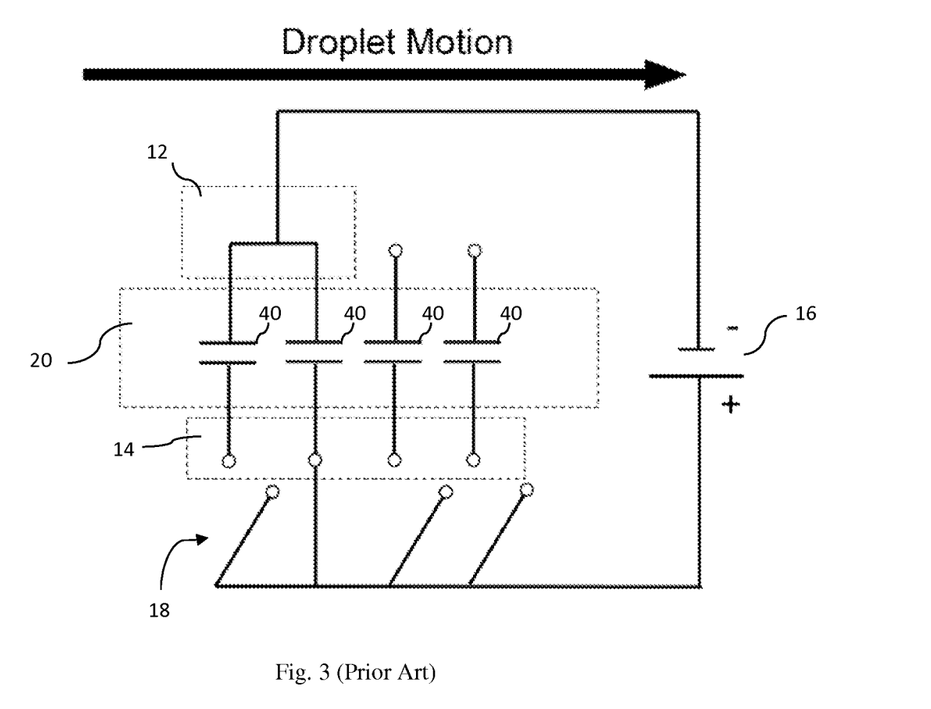
FIG. 3 depicts the idealized equivalent circuit of the prior art EWOD designs for droplet transport.

A simplified electrical schematic of the prior art devices might look something like FIG. 3. The circuit consists of the droplet 12, a voltage source 16, a switch 18 to control which of the series of electrodes 14 is energized, and a dielectric layer 20. The dielectric layer 20 is modeled as idealized electrical components, namely capacitors 40. If an additional composite dielectric layer is used (a dielectric layer topped by a surface treatment) there would be a second capacitor placed in series with the one representing the dielectric layer. In this design, the electrode 14 used is highly conductive and as such is modeled to be at equipotential with the applied voltage source 16. The design (and many other electrowetting designs) necessitates grounding of the circuit through the top of the droplet 12. For cases of static electrowetting (where the droplet 12 does not move) electrical contact can be made as simply as placing a wire into the bulk of the droplet 12. In cases of electrowetting where the droplet moves, a common technique has been to use a single continuous top plate electrode (not shown) so that the droplet 12 is always grounded so long as its top remains in contact with the top plate electrode.

Still referring to FIG. 3, only one electrode 14 is energized. As such, there is contact angle reduction only on the right side of the droplet 12, resulting in a small motion to the right. Once the droplet has moved to cover the next electrode 14 to the right, it will be in turn energized, and the previously energized electrode 14 switched off. This results in another small motion to the right. In this way, an electrical potential difference is always maintained at the right hand (leading) edge of the droplet 12.

Figure 4:
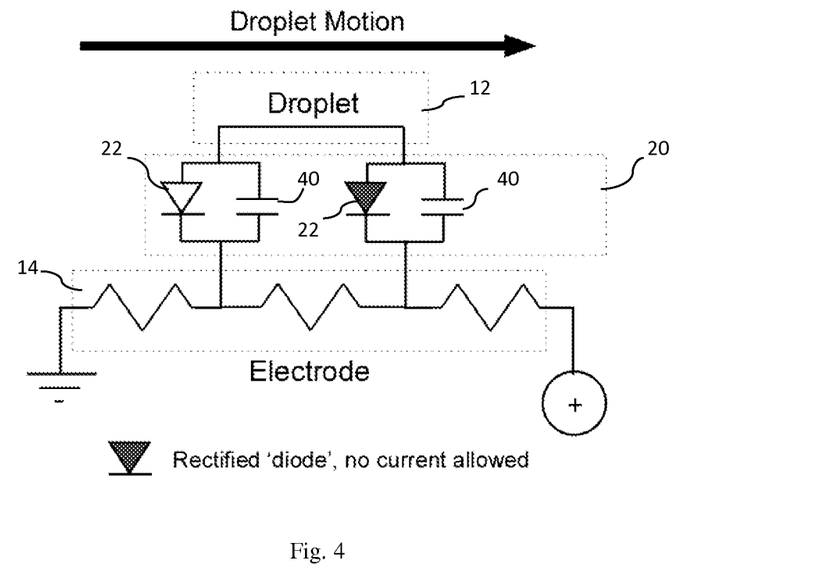
FIG. 4 depicts idealized equivalent circuit of the claimed invention includes a diode.

As depicted in FIG. 4, the electrowetting system of the claimed invention achieves droplet motion by creating a potential difference between only a portion of the droplet 12 and substrate by the introduction of a diode 22. Diode 22 permits droplet 12 movement using a much simpler design, and allows for continuous motion (rather than in small discrete steps as in the prior art). Moreover, the introduction of a diode 22 into the system makes the system dependent upon the polarity of the voltage. The entire device consists of a single circuit.

Figure 5:
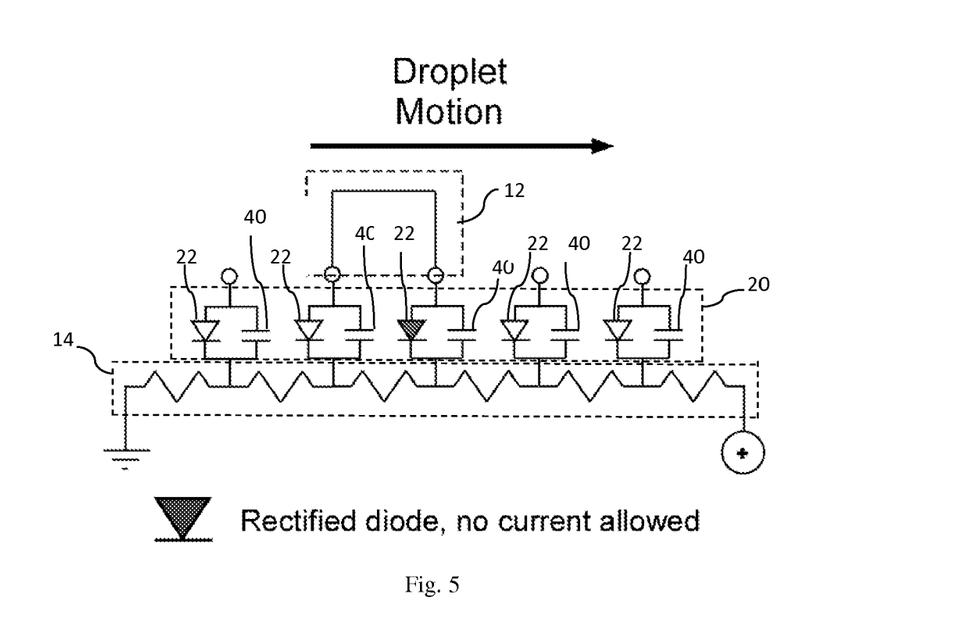
FIG. 5 depicts the idealized equivalent circuit of an array of diode-capacitor sites demonstrating how continuous droplet motion is achieved.
Figure 6:
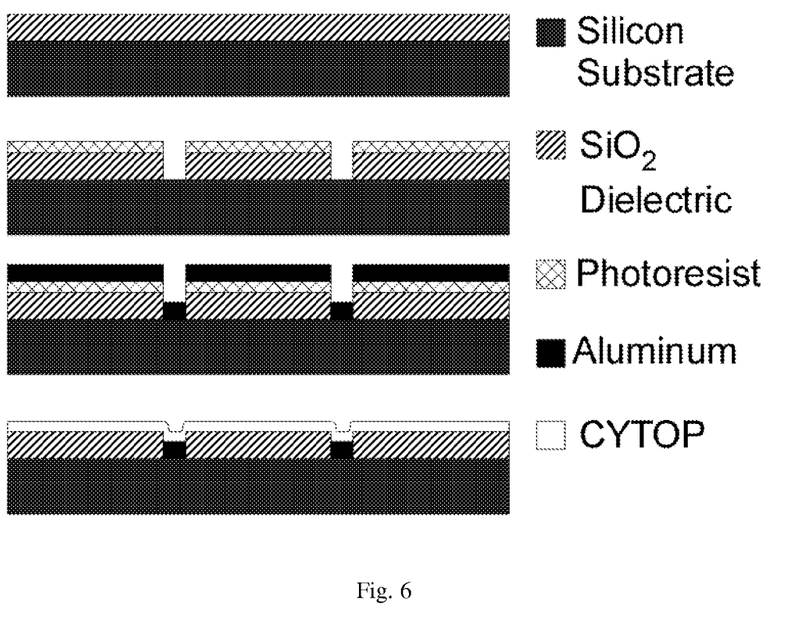
FIG. 6 illustrates the method of fabricating the electrowetting system.

As depicted in FIG. 5, a voltage is applied across a substrate electrode 14 atop which are patterned a series of diodes 22 and capacitors 40 (dielectric layer) in parallel. Any two adjacent diodes 22 will be at a different potential (due to the resistance of the electrode 14), the difference being a function of the total voltage applied across the electrode and the geometry of the device (namely the total length of electrode and spacing between adjacent diodes). When two adjacent diodes 22 are connected electrically by the presence of the droplet 12, the more positively charged diode 22 will be reverse-biased (preventing the flow of current) and the more negatively charged diode 22 will be forward-biased (allowing current flow). The result is a potential difference between the droplet 12 and electrode 14 at the reverse-biased diode 22 but not at the more negatively charged forward-biased diode 22. This potential difference combined with the capacitance 40 provided by the dielectric layer results in a contact angle reduction through electrowetting effects in the area surrounding the reverse-biased diode 22, while the equipotential between the droplet 12 and forward-biased diode 22 means the voltage in the Young-Lippmann equation is essentially zero resulting in no contact angle reduction in the area surrounding the forward-biased diode 22.

To achieve motion, the prior art required the operator to switch to the next electrode in sequence to achieve another step of motion, and so on until the total motion was complete. In contrast, in the electrowetting system of the claimed invention, as depicted in FIG. 5, this is not necessary. The resistance of the electrode 14 between diode sites provides for a voltage drop between them, resulting in each diode being at a different potential than any other. As the droplet moves to the right and covers the next-most positively charged diode, that diode will become reverse-biased, preventing current flow and resulting in a potential difference between the droplet and surrounding electrode. Meanwhile, the previously reverse-biased diode is now more negatively charged than the newly covered diode, and as such becomes forward biased, allowing current flow and eliminating the contact angle reduction. The net effect of all this is that the droplet motion will continue automatically across the length of the electrode in the direction of positive voltage gradient until either the pattern of diodes ends or the voltage is removed, requiring no switching of individual electrodes. Additionally, the polarity of the applied voltage determines the direction of droplet motion, whereas the prior art electrowetting setups show little to no dependence of response on voltage polarity. Another significant difference between our design and the prior art is the lack of need for a top plate electrode. In the claimed invention, the voltage is applied across the electrode (not between droplet and electrode) and the droplet only provides a parallel current path as it covers the various diodes. As such, the need for a top plate electrode vanishes, allowing more leeway in designing devices.

Example Embodiment #1

In an embodiment, the electrowetting system includes at least four components, each corresponding to one of the idealized electrical components discussed previously and depicted in FIG. 5. The system includes a doped silicon electrode substrate and is the equivalent to the resistors shown in FIG. 5. The next component, deposited atop the electrode layer, is the dielectric layer. This layer provides the majority of the capacitance needed to achieve the electrowetting effect. The next components are the valve metal sites. These provide the selective current rectification behavior needed for the electrowetting system to function, and as such can be equated to the diodes discussed previously. The final component includes a thin surface treatment layer. While the surface treatment will have an effect on the total capacitance of the system (and so may be considered as a portion of the capacitor) its major impact is not as an electrical component. In addition to acting as a portion of a composite dielectric layer, it provides significant mechanical benefits to the electrowetting system by providing an extremely non-wetting interface between droplet and substrate. Alternatively, a hydrophobic material may be used as the dielectric layer.

In the electrowetting system, the voltage term used in the Young-Lippmann equation to model contact angle reduction is not the total voltage applied across the entire electrode, but only the potential difference between the two adjacent valve metal sites. This is merely a function of the total applied voltage and the spacing between sites. In order to keep this value high enough to result in a significant difference in contact angle from one side of the droplet to another (and hence cause motion), it is necessary to use voltages much higher than is typical of most prior art EWOD designs where the voltage between electrode and electrolyte is the total applied voltage. To keep the current through the electrode and electrolyte at a minimum, a high resistivity substrate electrode is used. For availability and compatibility with microfabrication techniques, a large doped silicon wafer is used as a substrate in one embodiment, and once fabrication is completed, individual test strips are diced from it.

Because the electrode is a silicon wafer substrate, the simplest dielectric layer to use is a thermally-grown silicon dioxide ($SiO_2$) layer. This provides a robust dielectric layer that is easily grown, patterned and etched with standard microfabrication techniques, and provides satisfactory performance according to our model.

In order for the necessary selective current flow to occur at regular intervals, there must be periodically spaced portions of the electrode where the dielectric layer has been removed. In the design presented here, this is achieved by patterning small circular holes in the dielectric layer. Alternative designs could include strips of removed dielectric oriented perpendicular to the direction of desired droplet motion.

The spacing of the holes in the dielectric layer is a key design parameter. It must be such that for a given diameter droplet, at least two sites are always covered by the droplet. If at any time a droplet covered only one site, the equivalent circuit would not include parallel paths through both the substrate and electrolyte droplet (as current would only flow through the substrate) and droplet motion would cease. If on the other hand the hole spacing is made very very small, the voltage drop between any two adjacent sites would be such that the effective voltage across the drop would not be sufficient to ensure significant contact angle reduction at the leading edge.

The final piece in a functional device is the use of a valve metal layer at the bottom of the holes through the dielectric layer, separating the exposed electrode and the droplet itself. If this layer were not present, current could flow indiscriminately between electrode and droplet at all hole sites. The diode-like current rectification properties of valve metals allows for current to flow only when the valve metal is more negatively charged than the electrolyte. Since much of our previous work in exploring this diode-like behavior was done using thin aluminum films, it seemed reasonable to continue with this material. Aluminum is a valve metal which exhibits robust diode-like properties and is easy to deposit in pure layers of controlled thicknesses.

Metals commonly considered valve metals include tantalum, niobium, aluminum, zirconium, hafnium, tungsten, bismuth and antimony. Other elements, namely beryllium, magnesium, silicon, germanium, tin, titanium, and uranium, exhibit some of these properties and are sometimes counted in the ranks of valve metals. Successful actuation has been demonstrated with both aluminum and silicon sites. The use of silicon is favorable because it eliminates the need for depositing metal in the dielectric holes if a silicon substrate is used.

The final layer is a surface treatment applied to the entire top surface of the finished electrowetting system. The addition of a hydrophobic surface treatment aids in strong and dependable electrowettinq behavior. By increasing the natural contact angle of the three phase contact line, it allows for contact angle reductions of greater magnitude. In addition, it has been shown that a highly hydrophobic layer also reduces the severity of hysteresis. The Young-Lippmann equation indicates that the contact angle reduction for a given voltage should be identical, regardless of whether the angle is advancing or retreating (voltage is increasing or decreasing).

The hydrophobic surface treatment used in this design reduces hysteresis, allowing for more dependable performance. Also, when the intent of an EWOD design is to achieve droplet transport, hydrophobic layers tend to reduce the occurrence of 'pinning,' where a portion of the droplet will stick to the substrate. This pinning can result in either the cessation of droplet motion, or if the actuation force acting on the drop is sufficient it may cause a portion of the drop to continue its motion while the remainder remains anchored to the area of where pinning occurs causing the droplet to break in two.

To reduce the chances of pinning of the droplet at the valve metal sites, the design presented here covers the entire surface of the wafer with a hydrophobic layer. On first examination it would seem that the addition of a dielectric layer atop the valve metal would reduce or eliminate the necessary current flow at the negatively charged (trailing edge) site. However, the surface treatment layer applied is very thin and has a relatively low dielectric constant. Enough current leakage occurs across this layer that it does not significantly reduce performance, due to its natural porosity, and defects or other electrically conductive pathways.

A key benefit of the hydrophobic layer is its effect on the natural contact angle of the droplet-surface interface. This helps in achieving droplet motion in two related ways. First, by starting off with a larder natural contact angle, the total possible change in contact angle is greater. Secondly, since the actuation force acting on the droplet is the result of the asymmetry in contact angle from leading to trailing edge, the greatest actuation force is achieved by having the greatest possible natural contact angle and reducing it to the lowest value possible on the leading edge.

As mentioned above, the additional thickness provided by the hydrophobic layer and its dielectric properties has the effect of decreasing the total capacitance between electrode and droplet, which has an impact on electrowetting performance. The magnitude of this impact is determined by the hydrophobic layer used (and its dielectric constant) and the thickness of the applied layer.

CYTOP™ 809M (Asahi Glass is a useful surface treatment. This fluoropolymer provides a large natural contact angle and is easily laid down in thin consistent-thickness coats.

Example Embodiment #2

EWOD substrates with aluminum electrodes and 2.1 μm thick CYTOP™ dielectric layers were prepared. Defects in the dielectric layer were introduced by scratching the samples with a probe tip on a micropositioner. A 50 μl droplet of 1 mM NaCl solution was placed over the scratched area and voltage was applied to a probe placed in the droplet while the aluminum electrode was grounded. Aluminum self-passivates and prevents current flow in one direction. This creates a diode-like electrical behavior with diode breakdown voltage over 100 V.

Example Embodiment #3

The eletrowetting system is manufactured using microfabrication techniques, including thermal oxidation, photolithographic patterning and etching, electron-beam vapor deposition, and spin-coating. The substrate used for all iterations produced was a 4" diameter 270 μm thick wafer of silicon N-doped to a resistivity 300-500 Ω-cm. Using a predictive model (and assuming test strip widths of 8.98 mm) this would result in Joule heating of 0.37 to 0.62 W/cm$^2$ depending on where in the range of given resistivities the wafer is. Atop this wafer an oxide layer was grown using dry thermal oxidation to a final oxide thickness of 480 nm.

Initially several wafers were oxidized simultaneously to the same final thickness, with those not ready for immediate further processing set aside for later use. Later in the testing process it was decided that it would desirable to fabricate wafers with a slightly thinner oxide layer. Before further processing of these wafers, they were immersed in a standard hydrofluoric acid buffered oxide etch (BOE) to reduce total thickness to approximate 350 nm. Once the wafers held the desired thickness of oxide, they were prepared for photolithography.

This begins by first spin-coating a primer of Hexamethyldisilazane (HMDS) to ensure a good bond between oxide and photoresist. After priming, a layer of Shipley S1813 positive photoresist was applied via spin-coat. After spin-coating the wafer was subjected to a soft bake on a hotplate at 100° C. It was then masked and exposed, then submersed in Microposit MF-319 developer to remove the portions of photoresist that were exposed to UV during the exposure step. After a hard bake for one minute at 100° C. the now-exposed portions of oxide were etched away down to bare silicon by BOE.

After the photolithographic process is completed, but before removal of the unexposed photoresist, the entire wafer was coated with a layer of aluminum using electron-beam physical vapor deposition. Final thickness of the aluminum layer was 300 nm. This step results in aluminum covering the entire wafer, while the desired result is to have aluminum only at the bottom of the holes etched in the dielectric layer during photolithography (as well as small strips of aluminum deposited directly to the substrate electrode on each end, to aid in making electrical contacts). Since the photoresist layer remains from previous steps) covering all those areas which still have an oxide layer, when it is removed by rinsing in acetone it takes with it the aluminum that was deposited atop it. After this liftoff procedure, the result is a silicon wafer with an oxide layer atop it. In this oxide layer are a series of patterned holes, at the bottom of which (deposited directly atop the bare silicon) each contains a layer of aluminum.

All that remains is the surface treatment layer. The initial test wafer design called for a final CYTOP thickness of 180 nm. This was achieved using spin-coating. For each step, once the final spin speed is reached it is maintained until the total step duration has been reached Example Embodiment #4

It may be possible to create or improve diode-like characteristics by applying particular electrolytes. Diode-like behavior may be achieved based solely on the choice of electrolyte. For example, Citric Acid and Tartaric Acid are known to improve passivation of Aluminum.

Example Embodiment #5

We have demonstrated an additional embodiment in which the aluminum is not deposited in the holes so that silicon acts as the diode material.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall there between.

GLOSSARY OF CLAIM TERMS

Electrowetting: modification of the ability of a liquid to maintain contact with a solid surface with an applied electric field Dielectric: an electrical insulator that can be polarized by an applied electric field.

Diodes: a two-terminal electronic component with an asymmetric transfer characteristic.

Hydrophobic: the physical property of a molecule that is repelled from a mass of water.

Doping: intentionally introducing impurities into an extremely pure semiconductor for the purpose of modulating electrical properties.

Wafer: thin slice of semiconductor material.

Photoresist: light sensitive material.

Fluoropolymer: a fluorocarbon based polymer with strong carbon-fluorine bonds. Characterized by a high resistance to solvents, acids, and bases.

What is claimed is:

1. An electrowetting system for the smooth continuous movement of a droplet regardless of voltage polarity, comprising:
   an electrode layer adapted to act as a resistor in said electrowetting system;

a dielectric layer disposed in overlying relation to said electrode layer, said dielectric later adapted to act as a capacitor in said electrowetting system; and a plurality of diodes disposed within said dielectric layer, said plurality of diodes adapted to act as diodes in parallel with said dielectric layer.

2. An electrowetting system for the smooth continuous movement of a droplet regardless of voltage polarity as in claim 1, further comprising:

a hydrophobic surface treatment layer disposed in overlying relation to said electrowetting system, said hydrophobic surface treatment layer adapted to act as a capacitor in parallel with said dielectric layer and said plurality of diodes.

3. An electrowetting system for the smooth continuous movement of a droplet regardless of voltage polarity as in claim 2, wherein:

an electrolyte droplet disposed in overly relation to said hydrophobic surface treatment layer.

4. An electrowetting system for the smooth continuous movement of a droplet regardless of voltage polarity as in claim 3, wherein:

said plurality of plurality of diodes are disposed in said dielectric and spaced apart such that at least two of said diodes are covered by said droplet as any given time.

5. An electrowetting system for the smooth continuous movement of a droplet regardless of voltage polarity as in claim 2, wherein:

the hydrophobic surface treatment layer is a fluoropolymer.

6. An electrowetting system for the smooth continuous movement of a droplet regardless of voltage polarity as in claim 1, wherein:

said electrode substrate is a doped silicon wafer.

7. An electrowetting system for the smooth continuous movement of a droplet regardless of voltage polarity as in claim 1, wherein:

said dielectric layer is silicon dioxide.

8. An electrowetting system for the smooth continuous movement of a droplet regardless of voltage polarity as in claim 1, wherein:

said plurality of diodes are a valve metal.

9. An electrowetting system for the smooth continuous movement of a droplet regardless of voltage polarity as in claim 1, wherein:

said plurality of diodes are Al exposed to an aqueous solution comprising compounds selected from the group consisting of NaCl, $NaSO_4$, Citric Acid, or Tartaric acid.

10. An electrowetting system for the smooth continuous movement of a droplet regardless of voltage polarity, comprising:

an electrode layer acting as a resistor in said electrowetting system;

a dielectric layer disposed in overlying relation to said electrode layer, said dielectric later acting as a capacitor in said electrowetting system;

a plurality of diodes disposed within said dielectric layer, said plurality of diodes acting as diodes in parallel with said dielectric layer;

a hydrophobic surface treatment layer disposed in overlying relation to said electrowetting system, said hydrophobic surface treatment layer acting as a capacitor in parallel with said dielectric layer and said plurality of diodes;

an electrolyte droplet disposed in overly relation to said hydrophobic surface treatment layer; and responsive to a voltage applied to said electrowetting system, said electrolyte droplet moves due to a potential difference in said electrowetting system.

11. A method of fabricating an electrowetting system for the smooth continuous movement of a droplet regardless of voltage polarity, the method comprising:

providing an electrode layer adapted to act as a resistor in said electrowetting system;

applying a dielectric layer in overlying relation to said electrode layer, said dielectric later adapted to act as a capacitor is said electrowetting system; and creating a plurality of diodes disposed within said dielectric layer, said plurality of diodes adapted to act as diodes in parallel with said dielectric layer.

\* \* \* \* \*

UNITED STATES PATENT AND TRADEMARK OFFICE
CERTIFICATE OF CORRECTION

PATENT NO.        : 8,858,772 B2                                    Page 1 of 1
APPLICATION NO.   : 13/525806
DATED             : October 14, 2014
INVENTOR(S)       : Nathan B. Crane et al.

It is certified that error appears in the above-identified patent and that said Letters Patent is hereby corrected as shown below:

In the Claims

Column 9, Claim 1, Line 2 should read:

--electrode layer, said dielectric layer adapted to act as a--.

Column 9, Claim 3, Line 17 should read:

--claim 2, further comprising:--.

Signed and Sealed this
Tenth Day of March, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,858,772 B2  
APPLICATION NO. : 13/525806  
DATED : October 14, 2014  
INVENTOR(S) : Nathan B. Crane et al.

It is certified that error appears in the above-identified patent and that said Letters Patent is hereby corrected as shown below:

In the Claims

Column 9, Line 20, cancel the text beginning with "4. An electrowetting system" to and ending "given time." in Column 9, Line 25, and insert the following claim:

--4. An electrowetting system for the smooth continuous movement of a droplet regardless of voltage polarity as in claim 3, further comprising:
    said plurality of plurality of diodes disposed in said dielectric being spaced apart such that at least two of said diodes are covered by said droplet at any given time.--

Column 9, Line 30, cancel the text beginning with "6. An electrowetting system" to and ending "silicon wafer" in Column 9, Line 33, and insert the following claim:

--6. An electrowetting system for the smooth continuous movement of a droplet regardless of voltage polarity as in claim 1, further comprising:
    said dielectric layer being silicon dioxide.--

Column 9, Line 34, cancel the text beginning with "7. An electrowetting system" to and ending "silicon dioxide." in Column 9, Line 37, and insert the following claim:

--7. An electrowetting system for the smooth continuous movement of a droplet regardless of voltage polarity as in claim 1, further comprising:
    said plurality of diodes being a valve metal.--

Signed and Sealed this  
Fourth Day of August, 2015

Michelle K. Lee  
*Director of the United States Patent and Trademark Office*

UNITED STATES PATENT AND TRADEMARK OFFICE
CERTIFICATE OF CORRECTION

PATENT NO. : 8,858,772 B2
APPLICATION NO. : 13/525806
DATED : October 14, 2014
INVENTOR(S) : Nathan B. Crane et al.

It is certified that error appears in the above-identified patent and that said Letters Patent is hereby corrected as shown below:

Column 9, Line 26, cancel the text beginning with "5. An electrowetting system" to and ending "is a fluoropolymer." in Column 9, Line 29, and insert the following claim:

--5. An electrowetting system for the smooth continuous movement of a droplet regardless of voltage polarity as in claim 1, further comprising:
　　said electrode layer being a doped silicon wafer.--

Column 10, Line 2, cancel the text beginning with "9. An electrowetting system" to and ending "Tartaric acid." in Column 10, Line 7, and insert the following claim:

--9. An electrowetting system for the smooth continuous movement of a droplet regardless of voltage polarity as in claim 2, further comprising:
　　said hydrophobic surface treatment layer being a fluoropolymer.--

Column 10, Line 8, cancel the text beginning with "10. An electrowetting system" to and ending "electrowetting system." in Column 10, Line 28, and insert the following claim:

--10. An electrowetting system for the smooth continuous movement of a droplet regardless of voltage polarity, comprising:
　　an electrode layer adapted to act as a resistor in said electrowetting system;
　　a dielectric layer disposed in overlying relation to said electrode layer, said dielectric layer adapted to act as a capacitor in said electrowetting system;
　　a plurality of diodes disposed within said dielectric layer, said plurality of diodes adapted to act as diodes in parallel with said dielectric layer;
　a hydrophobic surface treatment layer disposed in overlying relation to said electrowetting system, said hydrophobic surface treatment layer adapted to act as a capacitor in parallel with said dielectric layer and said plurality of diodes;
　　an electrolyte droplet disposed in overly relation to said hydrophobic surface treatment layer; and Signed and Sealed this
　　　　　　　　　Fifteenth Day of March, 2016

Michelle K. Lee
*Director of the United States Patent and Trademark Office* a voltage source applied to said electrowetting system, whereby said electrolyte droplet moves due to a potential difference in said electrowetting system.--

UNITED STATES PATENT AND TRADEMARK OFFICE
CERTIFICATE OF CORRECTION

PATENT NO. : 8,858,772 B2
APPLICATION NO. : 13/525806
DATED : October 14, 2014
INVENTOR(S) : Nathan B. Crane et al.

It is certified that error appears in the above-identified patent and that said Letters Patent is hereby corrected as shown below:

In the Claims

Column 9, Line 38, cancel the text beginning with "8. An electrowetting system" to and ending "a valve metal." in Column 10, Line 1, and insert the following claim:

--8. An electrowetting system for the smooth continuous movement of a droplet regardless of voltage polarity as in claim 1, further comprising:
  said plurality of diodes being Al exposed to an aqueous solution containing NaCL.--

Signed and Sealed this
Twenty-eighth Day of June, 2016

Michelle K. Lee
*Director of the United States Patent and Trademark Office*